Aug. 29, 1939.　　　　　P. OSTRUK　　　　2,170,910
COMBINATION LIFTING JACK AND WHEEL LOCKING ARRANGEMENT
FOR AUTOMOBILES OR LIKE VEHICLES
Filed May 25, 1937　　　3 Sheets-Sheet 3
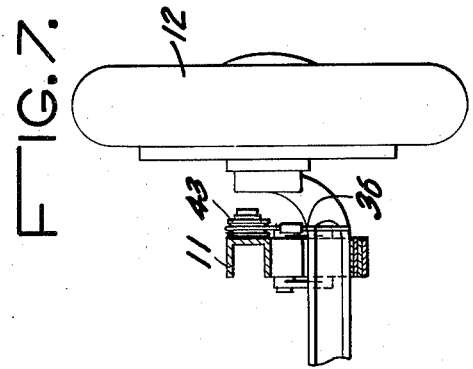
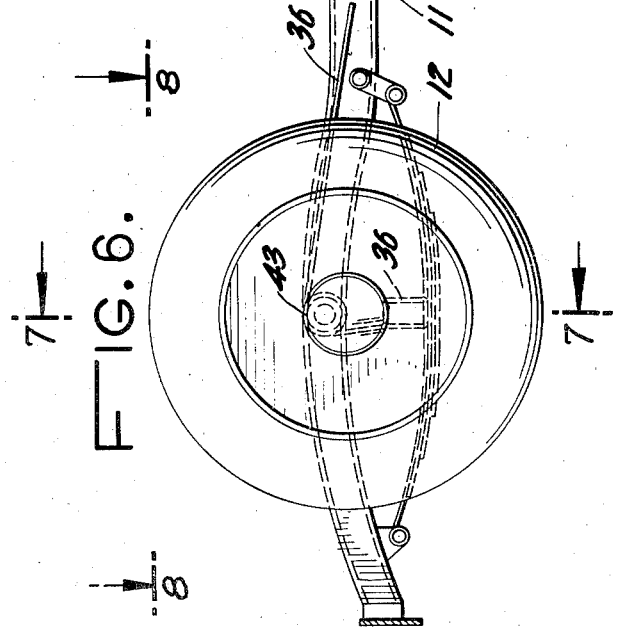
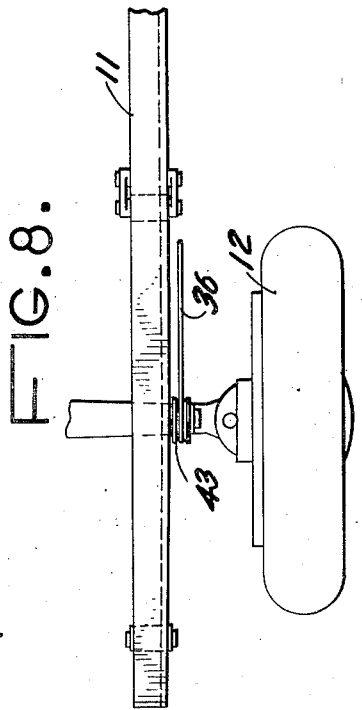
INVENTOR.
Paul Ostruk
BY
Louis Casper
ATTORNEY.

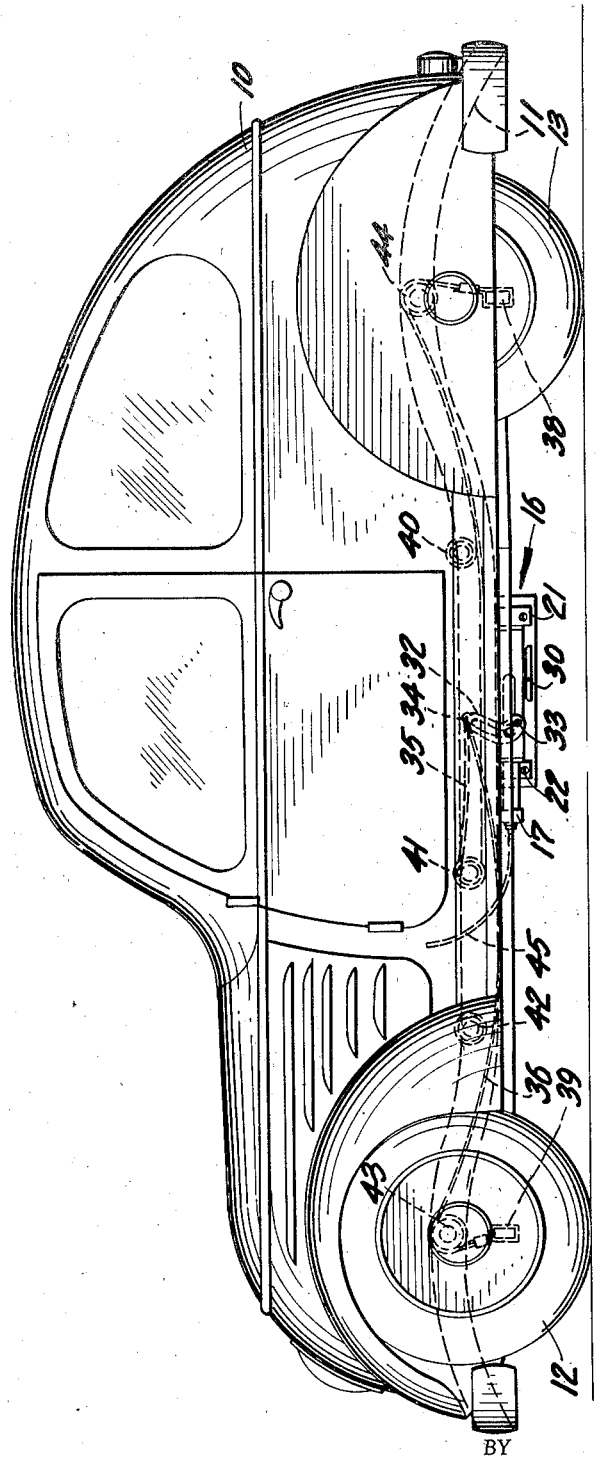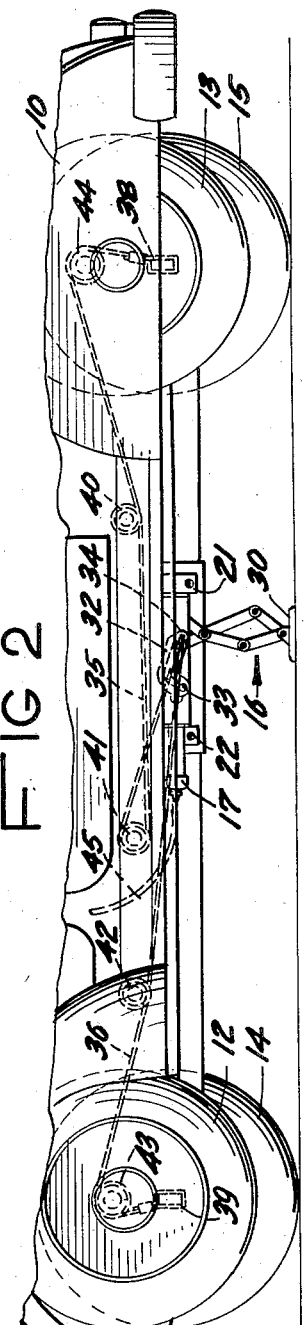

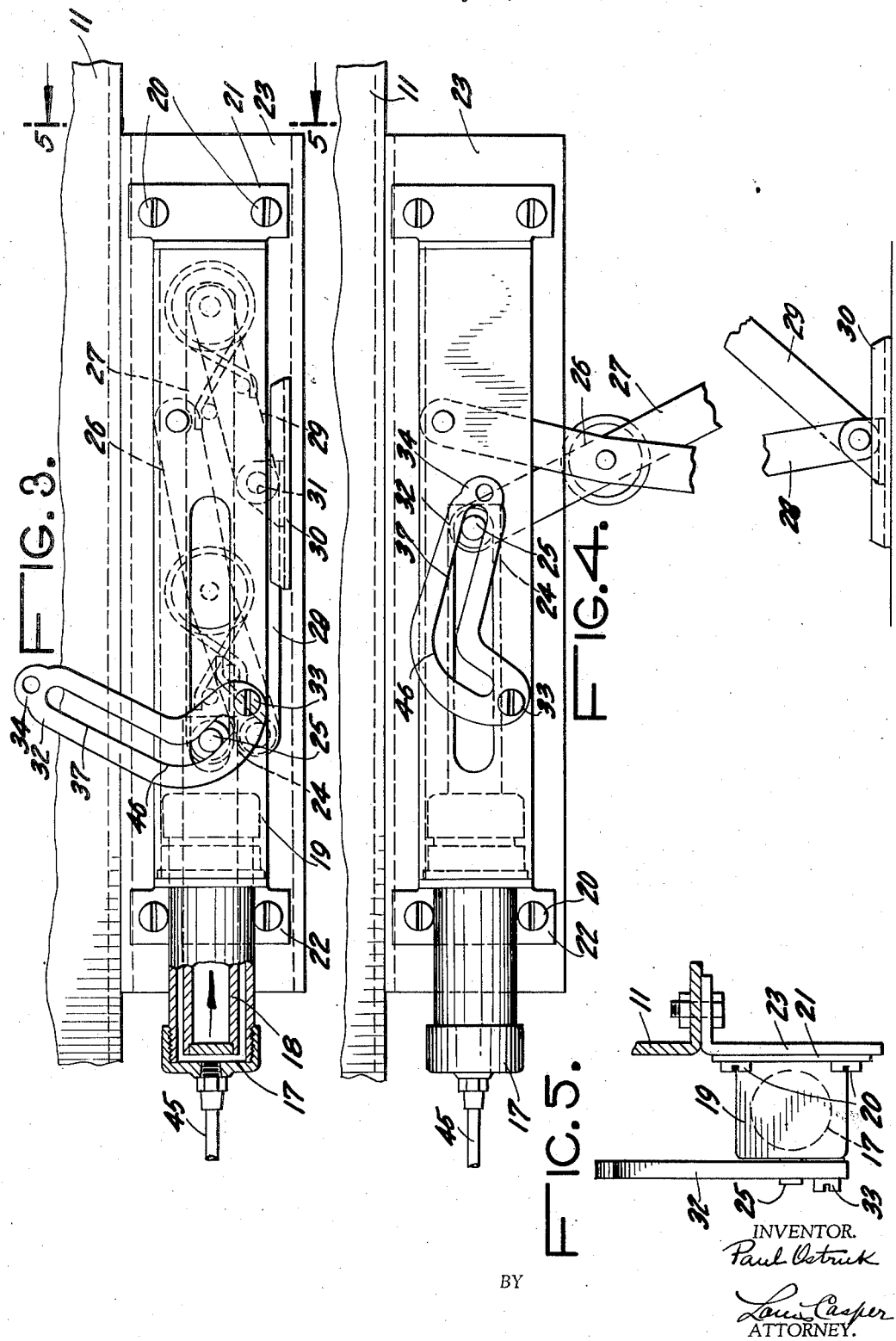

Patented Aug. 29, 1939

2,170,910

UNITED STATES PATENT OFFICE 2,170,910

COMBINATION LIFTING JACK AND WHEEL LOCKING ARRANGEMENT FOR AUTOMOBILES OR LIKE VEHICLES

Paul Ostruk, New York, N. Y.

Application May 25, 1937, Serial No. 144,569

10 Claims. (Cl. 254—86)

This invention relates to automobile or like vehicle jacking devices, especially of the type that utilizes a hydraulically operated jack that is arranged in such a manner that when the car is jacked up, the wheels of the car are locked securely into place automatically.

The automatic wheel locking feature of my invention is of great importance, especially for cars that have their wheels independently suspended.

An object of this invention is the utilization of a jack that can be operated hydraulically from a pump and said pump in turn operated by an electric motor.

A further object of this invention is to provide means to operate a pair of locking devices on either side of the car to lock both wheels simultaneously dependent on which side of the car is being lifted.

A further object of the invention is to lock the wheels by locking means operated by flexible cables from the jacks aforesaid.

Other objects will become apparent as the description of the invention proceeds.

Referring to the figures—

Fig. 1 illustrates a front view of a car showing the jack in an inoperative position; the figure also shows the lock operating flexible cables.

Fig. 2 illustrates the car jacked up and the flexible cables shown in position for locking the car wheels in place.

Fig. 3 shows the hydraulically operating jack in connection with the cam arm for operating the flexible cables, said cables shown in initial operative position.

Fig. 4 shows the same jacking cam arm after completing the jacking operation.

Fig. 5 shows a section of the jack on a line 5—5 of Fig. 3.

Fig. 6 shows a detail of a wheel of the car and the arrangement of a flexible cable for locking the wheels in place.

Fig. 7 is a section on a line 7—7 of Fig. 6.

Fig. 8 is a section on a line 8—8 of Fig. 6.

Referring to Fig. 1, the numeral 10 represents the body of the car, 11, the chassis, 12 and 13 are the wheels of the car at one side, 14 and 15 are wheels on the opposite side. (See Fig. 2.) A jack 16 which is of the type jack shown in the specification Serial No. 119,176 filed January 6, 1937, is secured on either side of the car and the chassis 11. The jack 16 comprises essentially of the following main features: a hydraulic cylinder 17 having a piston 18 that is secured to a U-shaped bracket 19 which is screwed into position by means of the screws 20 and 21 and L-shaped clip 22 to the angle iron 23, and said angle iron in turn is secured to the chassis 11 of the car.

The piston 18 is secured at 24 by means of a pin 25 to the series of links 26, 27, 28 and 29 which comprise a lazy tong jack arrangement. A shoe 30 is pivotally secured to said lazy tong arrangement by means of pin 31, said shoe assists in supporting the car when the jack is extended in the manner shown in Fig. 4.

A cam arm 32 which is hinged on a pivot bearing 33 at one end and the opposite end at 34 is secured to a pair of flexible cables 35 and 36. (See Fig. 1.) The cam arm 32 has a slot 37 through which the pin 25 protrudes.

The flexible cables 35 and 36 are secured to the axles 38 and 39 of the wheels 12 and 13. A series of idler pulleys 40 and 41 and 42 serve to facilitate the pulling up of said flexible cables into position.

Another pair of idler pulleys 43 and 44 are located immediately over each of the axles 39 and 38 of the wheels and over which the flexible cables 35 and 36 are wound.

The operation of the jacking arrangement is as follows:

When the attendant of the car desires to lift up either side of the car, said attendant starts into operation an electric motor which in turn starts a hydraulic pump (not shown in drawings).

Said pump pumps oil at a pressure through the connecting pipe 45 and said oil is delivered under pressure to the cylinder 17.

The piston 18 due to the pressure of the oil inside the cylinder 17, moves in the direction indicated by the arrow. Under pressure impulse of the cylinder, the lazy tong jack arrangement is projected beyond the body of the U-shaped bracket 19 as shown in Fig. 4.

The pin 25 which follows along with the movement of the piston 18 and which extends through the slot 37 of the horse neck curved cam arm 32, forces said cam arm to the inclined position shown in Fig. 4. The pin 25 also pivotally secures the link 27 to the piston 18.

As the locking cables 35 and 36 are secured to the cam arm 32 at the point 34, said cables are pulled taut thus locking the wheel axles 38 and 39 to the pulleys 43, 44 respectively to the chassis 11.

The cam arm slot 37 having a curved conformation in similar relation to the cam arm 32, causes the timing of the locking of said wheels to take place prior to the completion of the jacking up process of the car. The slot 37 is curved in the manner shown at 46, said curved conformation causes the pin 25 to bring said cam arm into the position shown in Fig. 4 as soon as the pin 25 passes through the section designated by the numeral 46 of the slot 37.

The foregoing detailed description has been given for clearness of understanding only and no unnecessary limitations should be understood therefrom, and construed as broadly as permissible in view of the prior art.

Now, having described my invention what I claim is:

1. In a jacking arrangement for an automotive or like vehicle of the class described comprising a lazy tong jack, said jack made operable by means of a piston inside a hydraulic cylinder, a cam arm exterior to said cylinder and pivotally connected thereto and being made operable by the translatory movement of said piston, said cam arm also operatively connected to flexible cables for the purpose of locking the wheel axles to the chassis of said vehicle into place, said cam arm intermediately operative concurrently with the operation of the jack aforesaid.

2. The structure as set forth in claim 1—and means provided by said cam arm for locking said wheel axles rigidly into place prior to the completion of the jacking up of the car by the lazy tong jack aforesaid.

3. In a jacking arrangement for automobiles or like vehicles including in combination a lazy tong jack, hydraulic pressure means for operating said jack, the operation of said jack being concurrent with the operation of means for locking the wheel axles of said vehicle into place, said locking means comprising an arm, said arm pivotally mounted on said hydraulic pressure means said arm also operated by said hydraulic means, said arm having flexible cables connected thereto, said cables attachable to said wheel axles and operable by the arm aforesaid.

4. In a jacking arrangement for an automobile or like vehicle including therein a lazy tong jack and hydraulic pressure means for operating said jack, the operation of said jack being concurrent with the operation of the means for locking the wheel axles of said vehicle into place, said locking means comprising a cam arm also operable by said hydraulic means, said cam arm hinged to a pivot, said pivot secured to the hydraulic pressure means at one end thereof, one end of a pair of cables secured to the end opposite the pivoted end of said cam arm, the opposite end of said cables secured to the respective axles of said wheels, the forward movement of said cam arm causing said cables to become taut thereby locking the respective axles of the wheels aforesaid.

5. The structure as set forth in claim 4—said cam arm having a slot, a pin in said slot, said pin operatively connected with said hydraulic pressure means, said slot being conformed in a manner to cause the movement of said locking arrangement to occur in advance of the completion of the lifting of the vehicle by the lazy tong jack aforesaid.

6. In a jacking arrangement of the class described including a lazy tong jack and hydraulic pressure means for operating a piston for operating said jack, a pin attached to said piston a cam arm pivotally mounted on said hydraulical pressure means said pin movable in a slot of said cam arm, the translatory movement of said piston to cause said pin to move said cam arm, said pin secured to said lazy tong jack, the forward movement of said pin to cause said jack to expand and the retraction of said pin to cause corresponding retraction of said jack; said cam arm having secured to it a pair of cables, the extended ends thereof secured to the wheel axles of said vehicle, whereby the forward push of said piston to cause said cables to become taut thereby locking the wheels of the vehicle aforesaid.

7. In a jack arrangement for an automobile or like vehicle, a pressure operated cylinder, a piston in said cylinder, a cam arm pivotally mounted on said cylinder a pin attached to said piston, said pin engageable in a slot of said cam arm, said pin likewise pivotally connected to a lazy tong jack, the translatory movement of said pin to cause the expansion or retraction of said jack, a pair of cables attached to one end of said cam arm the extended ends of said cables attached through pulley means to the wheel axles of said vehicle, the forward movement of said pin also causing said cables to become taut thereby locking the wheel axles aforesaid.

8. The structure as set forth in claim 6—said cam arm, and the slot therein having a horse neck curved conformation, said conformation causing the movement of the locking of the wheel axles aforesaid to occur in advance of the completion of the operation of the lifting jack aforesaid.

9. In a jack arrangement for an automobile or like vehicle, a pressure operated cylinder a piston in said cylinder, a pin attached to and moving with said piston, said pin engageable in a slot of a horse neck curved cam arm, said horse neck curved cam arm pivotally mounted on said cylinder, said pin pivotally connected to a jack to cause when said piston is moved forward the expansion of said jack whereby the body of said vehicle may be lifted, and the reverse movement of said pin to cause said jack to retract, and said cam arm having means attached thereto to cause the wheels of said vehicle to lock on the forward movement of the cam arm aforesaid.

10. In a lifting jack for automobiles or like vehicles having a hydraulically operated cylinder, said cylinder having a piston, a horse neck curved cam arm pivotally mounted on said cylinder body, a pin integral to said piston, said pin moving reciprocally in a slot of said horse neck curved cam arm, said cylinder pivotally connected to a jack and causing the expansion or retraction of said jack, said cam arm having cable or like strap means attached thereto for locking the wheels of said vehicle on the forward movement of said cam arm, and to unlock said wheels on the backward movement of the cam arm aforesaid.

PAUL OSTRUK.